United States Patent
Carr

(10) Patent No.: US 7,554,674 B2
(45) Date of Patent: Jun. 30, 2009

(54) OPTICAL DISPLACEMENT SENSOR

(75) Inventor: Dustin Wade Carr, Albuquerque, NM (US)

(73) Assignee: Symphony Acoustics, Inc., Rio Rancho, NM (US)

(*) Notice: Subject to any disclaimer, the term of this patent is extended or adjusted under 35 U.S.C. 154(b) by 0 days.

(21) Appl. No.: 12/122,342

(22) Filed: May 16, 2008

(65) Prior Publication Data

US 2008/0291457 A1  Nov. 27, 2008

Related U.S. Application Data

(63) Continuation-in-part of application No. 12/051,647, filed on Mar. 19, 2008.

(60) Provisional application No. 60/939,762, filed on May 23, 2007.

(51) Int. Cl.
*G01B 9/02* (2006.01)
*G01L 1/24* (2006.01)

(52) U.S. Cl. .................... 356/519; 356/35.5

(58) Field of Classification Search ............. 356/35.5, 356/454, 480, 519; 250/227.19, 227.27; 359/578

See application file for complete search history.

(56) References Cited

U.S. PATENT DOCUMENTS

| | | | | |
|---|---|---|---|---|
| 5,218,420 A * | 6/1993 | Asmar | ........................ | 356/480 |
| 5,832,157 A * | 11/1998 | Berthold et al. | ............... | 385/51 |
| 5,986,759 A * | 11/1999 | DeCain et al. | .............. | 356/519 |
| 6,281,976 B1 * | 8/2001 | Taylor et al. | ................. | 356/480 |
| 6,473,713 B1 * | 10/2002 | McCall et al. | ............... | 702/141 |
| 6,563,593 B2 * | 5/2003 | Hill | ............................ | 356/510 |
| 7,042,579 B2 * | 5/2006 | North Morris | ............... | 356/519 |
| 7,043,102 B2 * | 5/2006 | Okamoto et al. | .............. | 385/12 |
| 7,355,723 B2 * | 4/2008 | Carr | ............................ | 356/519 |
| 7,359,067 B2 * | 4/2008 | Carr | ............................ | 356/519 |
| 7,495,775 B2 * | 2/2009 | Carr | ............................ | 356/519 |

* cited by examiner

*Primary Examiner*—Michael A Lyons
(74) *Attorney, Agent, or Firm*—DeMont & Breyer LLC

(57) ABSTRACT

An optical displacement sensor for sensing an environmental stimulus is disclosed. The optical displacement sensor exhibits an optical design that has suppressed back reflection and improved alignment tolerance between its optical components. The sensor is based on an optically resonant cavity whose cavity length is affected by the environmental stimulus. An embodiment of the present invention utilizes a lens to redirect a first light signal toward an optically resonant cavity such that the light is incident on the cavity at a non-normal angle of incidence.

21 Claims, 4 Drawing Sheets

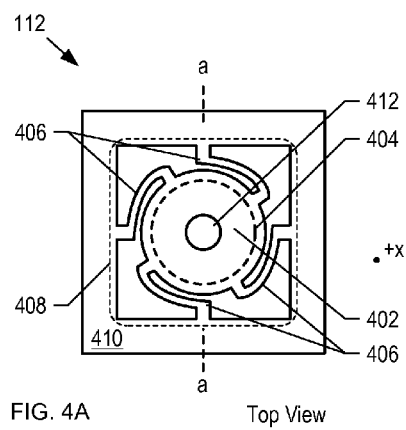
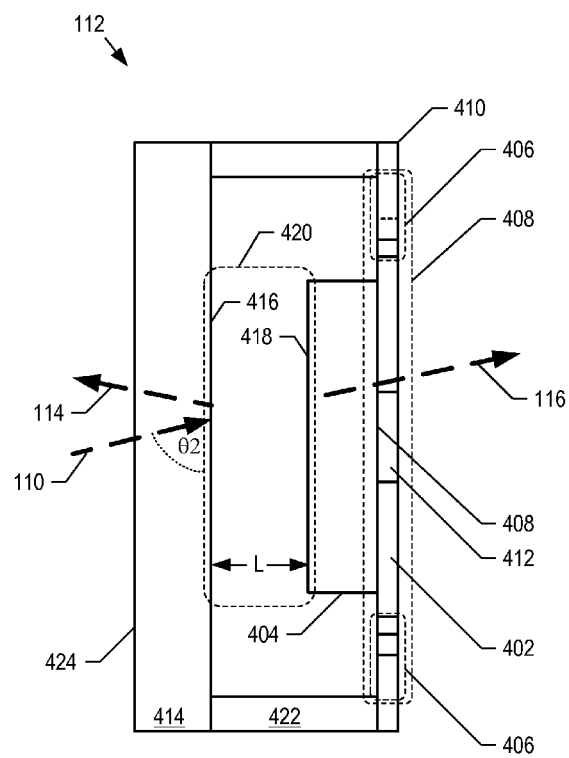
FIG. 4A Top View
FIG. 4B Cross-sectional View (through a-a)

OPTICAL DISPLACEMENT SENSOR

CROSS REFERENCE TO RELATED APPLICATIONS

This case is a continuation-in-part of co-pending U.S. patent application Ser. No. 12/051,647 filed Mar. 19, 2008, which is incorporated by reference herein. This case also claims priority to U.S. Provisional Patent Application Ser. No. 60/939,762, filed May 23, 2007, which is incorporated by reference herein.

The underlying concepts, but not necessarily the language, of U.S. Pat. No. 7,355,723, issued 8 Apr. 2008, are incorporated by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to displacement sensors in general, and, more particularly, to optical displacement sensors.

BACKGROUND OF THE INVENTION

Displacement sensors, such as microphones, accelerometers, and pressure sensors, are well-known. Displacement sensors based on capacitive, impedance, and optical measurements have been developed. Optical displacement sensors are particularly attractive as they overcome many of the limitations of capacitive and impedance measurement techniques, such as low sensitivity, the need for high voltage biasing, poor electrical isolation, or response nonlinearities.

Many optical displacement sensors known in the prior art operate by detecting light reflected by an optical element that changes its reflectivity in response to a pressure differential, sound, vibration, etc. An optically resonant cavity, such as a Fabry-Perot interferometer arrangement, has often been used as such an optical element. An optically resonant cavity has a reflectivity that depends on the spacing between two parallel partially-reflective surfaces. In order to form an optically resonant cavity that is sensitive to an environmental stimulus, such as sound, acceleration, etc., one surface of the optically resonant cavity is a movable surface. When the movable surface moves in response to the environmental stimulus, the reflectivity of the cavity is changed. The intensity of the detected light changes as well, therefore, thereby resulting in an electrical signal based on the incident acoustic energy of the sound.

In many optical displacement sensors, a source is used to provide light that is directed toward the optically resonant cavity. Since in most cases, the source is a coherent light source, it is important to keep light from being reflected back from the cavity into the source. Such back reflections can cause source instability, noise, and negatively impact reliability.

In addition, the alignment between such a source, an optically resonant cavity, and additional optical components typically must be done with high precision that has to be maintained throughout the life of the displacement sensor. The need to attain and maintain tight alignment tolerances between multiple optical components can lead to high cost of such systems.

A packaging approach that provides good back reflection suppression and also eases alignment tolerances is, therefore, highly desirable.

SUMMARY OF THE INVENTION

The present invention enables the optical detection of an environmental stimulus without some of the costs and disadvantages for doing so in the prior art. For example, embodiments of the present invention are particularly well-suited for use in microphones, accelerometers, vibration sensors, gravimeters, pressure sensors, inertial navigation systems, and earthquake detectors.

The embodiments described herein are specific optical arrangements suitable for use with a generic optical displacement sensor, such as is described in U.S. patent application Ser. No. 11/366,730 filed Mar. 2, 2006, now U.S. Pat. No. 7,355,723, issued 8 Apr. 2008, which is incorporated by reference herein.

The present invention provides a means of aligning an optical system that comprises a light source, an optical cavity, and a photodetector without some of the costs and disadvantages of the prior art. Embodiments of the present invention include a coupler that has (1) a first lens for receiving light from the light source and (2) a second lens that is operated in pupil-division-mode. The coupler receives light from the light source and couples light into and out of an optical system that includes an optical cavity. The optical cavity is at least partially optically-resonant at the wavelength of light emitted by the light source. The optical path of the light coupled into the optical system is separated from the optical path of the light coupled out of the optical system by virtue of the pupil-division operation of the second lens. As a result, back reflections to the light source are suppressed.

An embodiment of the present invention comprises: a source of optical energy having a first wavelength, wherein the source enables the propagation of the optical energy along a first direction; an optically resonant cavity comprising a first surface and a second surface that collectively define the optically resonant cavity, wherein the optically resonant cavity distributes received optical energy having the first wavelength into a first portion and a second portion, and wherein the ratio of the first portion and the second portion is based on an environmental stimulus; and a lens having a central optical axis; wherein the source, lens, and optically resonant cavity are arranged such that (1) the lens receives the optical energy from the source, wherein the received optical energy is centered at a point that is displaced from the central optical axis, (2) the lens redirects the optical energy so that the optical energy propagates along a second direction toward the optically resonant cavity, wherein the second direction and the second direction are non-co-linear, and (3) the optically resonant cavity receives the optical energy that propagates along the second direction, wherein the second direction is non-orthogonal with the first surface.

BRIEF DESCRIPTION OF THE DRAWINGS

FIG. 4A depicts a top view of a schematic diagram of details of a sensor element in accordance with the illustrative embodiment of the present invention.

FIG. 4B depicts a cross-sectional view of a schematic diagram of details of a sensor element in accordance with the illustrative embodiment of the present invention.

DETAILED DESCRIPTION

The following terms are defined for use in this Specification, including the appended claims:

Cavity length means the instantaneous separation between two surfaces that form an optically-resonant cavity. Cavity length is fixed in the case of an optically-resonant etalon. Cavity length is variable in the case of an interferometer, such as a Fabry-Perot interferometer.

Mechanically-coupled means that one device is linked to another device such that movement of the one device affects the other device. For example, a motor and a mirror are mechanically-coupled if actuation of the motor causes motion of the mirror. This could be through direct contact, as in the case of two physically-coupled devices (e.g., a mirror that is mounted on a linear-motor); or through an intermediate medium (e.g., a mirror that is moved via a hydraulic force that is generated by a motor).

Operatively-coupled means that the operation of one device affects another device.

Physically-coupled means in direct, physical contact (e.g., a mirror that is mounted on a linear-motor).

Figure 1:
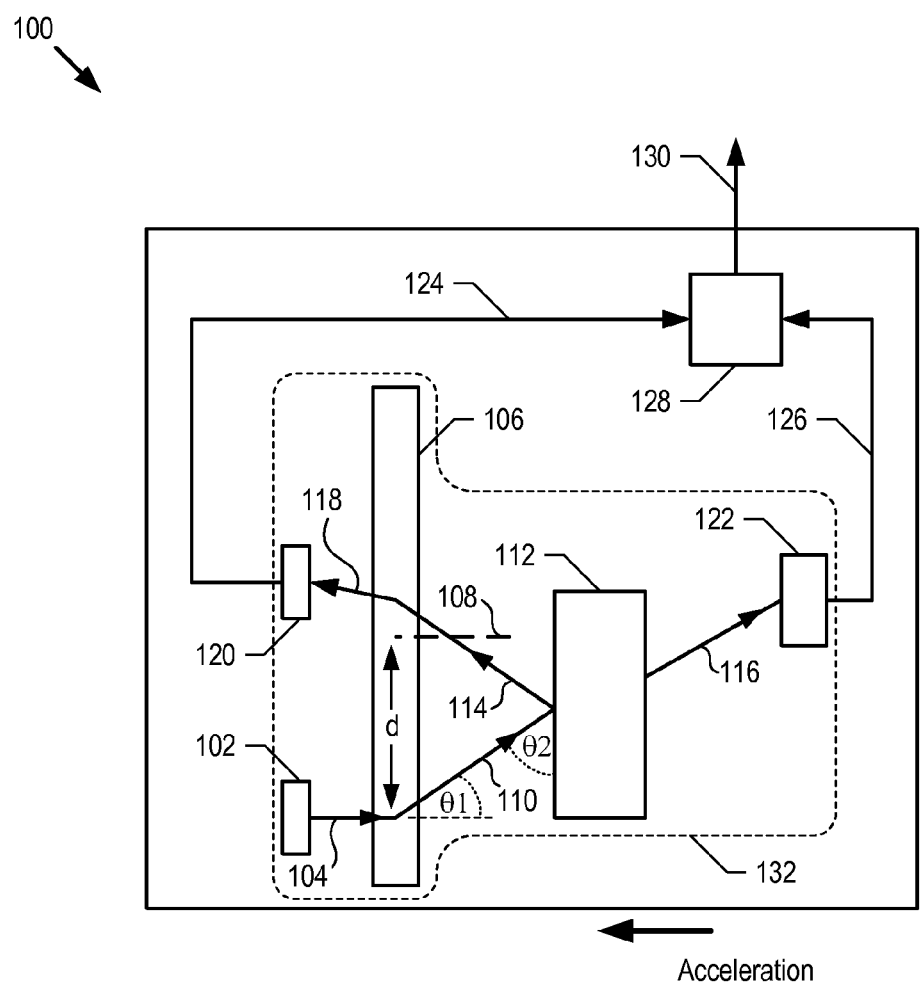
FIG. 1 depicts a schematic diagram of details of a displacement sensor in accordance with an illustrative embodiment of the present invention.

FIG. 1 depicts a schematic diagram of details of a displacement sensor in accordance with an illustrative embodiment of the present invention. Displacement sensor 100 comprises source 102, coupler 106, sensor element 112, photodetectors 120 and 122, and processor 128. Source 102, coupler 106, sensor element 112, and photodetectors 120 and 122 collectively define optical sub-assembly 132.

Displacement sensor 100 is configured as an accelerometer. It is physically adapted to convert an acceleration component directed along the x-direction (as shown) into electrical output signal 130. Although the illustrative embodiment comprises a displacement sensor for sensing an acceleration, it will be clear to one skilled in the art, after reading this specification, how to make and use alternative embodiments of the present invention wherein a displacement sensor senses a different environmental stimulus, such as acoustic energy, shock, vibration, heat, pressure, and the like.

In operation, source 102 provides light signal 104, which is redirected toward sensor element 112 as light signal 110 by coupler 106. Coupler 106 redirects the light by virtue of an offset (i.e., distance, d) between the center of light signal 104 and the central optical axis 108 of coupler 106. This is discussed in more detail below and with respect to FIG. 3. By virtue of this redirection, light signal 110 is incident upon sensor element 112 at a non-normal angle. As a result of this non-normal angle, back reflection of light signal 110 (i.e., reflection back toward source 102) is suppressed. Sensor element 112 comprises an optically resonant cavity that is physically adapted to distribute light signal 110 into reflected light signal 114 and transmitted light signal 116.

As described below, and with respect to FIGS. 4A and 4B, the ratio of optical energy in light signals 114 and 116 is based on the acceleration of displacement sensor 110 along the x-direction. Optical energy in light signals 114 and 116 is received by photodetectors 120 and 122, respectively, which provide electrical signals 124 and 126 to processor 128. Processor 128 generates electrical output signal 130, which is based on electrical signals 124 and 126.

Figure 2:
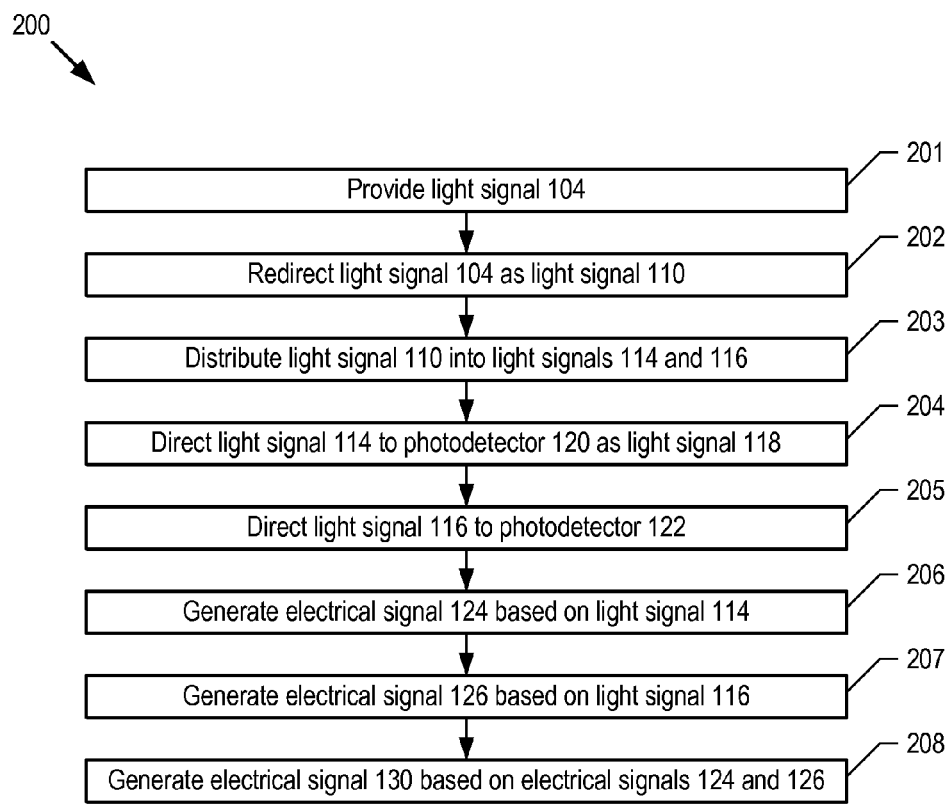
FIG. 2 depicts a method for sensing an acceleration in accordance with the illustrative embodiment of the present invention.

FIG. 2 depicts a method for sensing an acceleration in accordance with the illustrative embodiment of the present invention. Method 200 is described herein with continuing reference to FIG. 1 and reference to FIGS. 3, 4A, and 4B.

Method 200 begins with operation 201, wherein light signal 104 is provided by source 102. Source 102 is a vertical-cavity surface-emitting laser (VCSEL) that emits light signal 104 when it is energized with an electric current. Light signal 104 is substantially monochromatic light that has a wavelength suitable for operation with sensor element 112. The wavelength of light signal 104 is typically within the range of approximately 830 nanometers (nm) to approximately 860 nm, although any wavelength within the range of approximately 300 nm to approximately 1700 nm can be used. The spectral-width of the monochromatic light is typically less than one (1) nanometer.

In some alternative embodiments, source 102 is a source other than a VCSEL. Sources suitable for use in the present invention include, without limitation, light emitting diodes, edge emitting laser diodes, optical fibers carrying light emitted by a remote source of light, super-luminescent light-emitting diodes, and broad wavelength sources having narrow-wavelength-band filters that reduce their spectral bandwidth.

At operation 202, light signal 104 is received by coupler 106 and redirected toward sensor element 112 as light signal 110. As emitted from source 102, light signal 104 propagates along a first direction. Due to the influence of coupler 106, however, light signal 110 propagates along a second direction. These first and second directions collectively form angle θ1, which has a magnitude between 0 degrees and 90 degrees.

Figure 3:
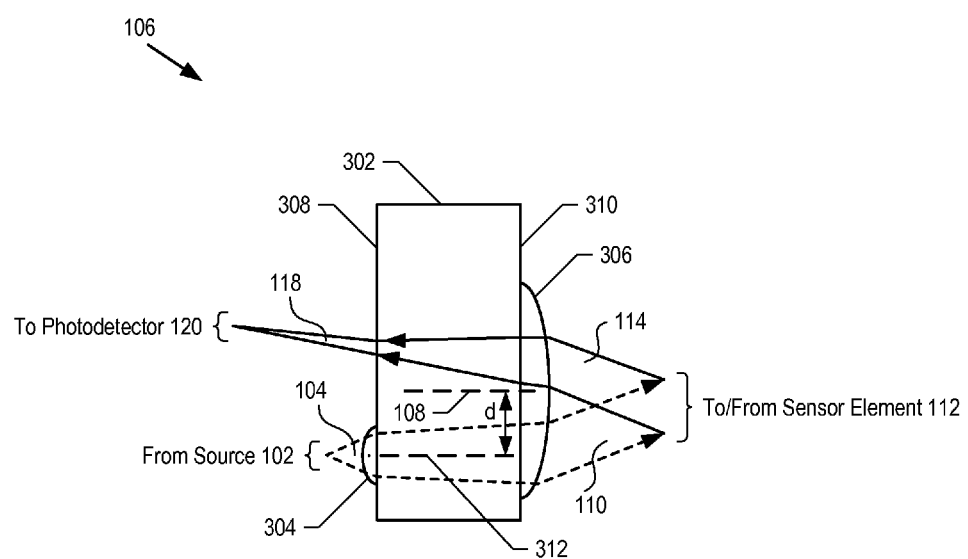
FIG. 3 depicts a schematic diagram of details of coupler 106.

FIG. 3 depicts a schematic diagram of details of coupler 106. Coupler 106 comprises substrate 302 and lenses 304 and 306, which are formed on opposing surfaces 308 and 310 of substrate 302.

Substrate 302 is a block of material that is substantially transparent at the wavelengths of light emitted by source 102. Substrate 302 serves to provide a desired separation between lenses 304 and 306. Although the specific width of substrate 302 is a matter of design choice, the thickness of substrate 302 as disclosed herein is approximately 0.5 mm. Designs that offer suitable performance have been designed wherein substrate 302 is a block of silicon dioxide that has a thickness within the range of approximately 0.3 to approximately 1 mm, although it will be clear to one skilled in the art that other thicknesses and materials for substrate 302 can be suitable.

Lens 304 is a spherical lens having a radius of curvature (ROC) of approximately 0.15 millimeter (mm) and central optical axis 312. Received light signal 104 is incident on lens 304 such that light signal 104 is substantially centered on the lens 304 (i.e., the optical center of light signal 104 and central optical axis 312 are substantially coincident). Lens 304 partially collimates light signal 104 and directs it toward lens 306, through substrate 302.

Lens 306 is a spherical lens having an ROC of approximately 0.3 mm. The central optical axis 108 of coupler 106 is the central optical axis of lens 306. Lens 304 directs light signal 104 to a point displaced from central optical axis 106 by distance, d, the offset distance between central optical axes 312 and 106. In the design disclosed herein, this offset distance is approximately 0.07 mm. In other words, the central ray of the light that propagates from lens 304 hits lens 306 at a point approximately 0.07 mm from the optical center of lens 306. As will be evident to one skilled in the art, the magnitude of angle θ1 is based upon offset distance, d.

It should be noted that the combination of lenses 304 and 306 serves to substantially collimate light signal 110, in addition to redirecting it along the second direction. In some embodiments, lens 304 is not included and lens 306 both substantially collimates light signal 110 and redirects it toward sensor element 112.

It should be noted that the design parameters disclosed herein, such as the material used for coupler 106, the offset distance between the centers of lenses 304 and 306, the ROC of each of lenses 304 and 306, and the thickness of substrate 302, are simply examples that denote one suitable optical design. Such parameters are a matter of design choice and are also dependent upon the wavelength of light provided by source 102. In addition, in some embodiments, one or both of lens 304 and lens 306 are diffractive lenses formed either on or in surface 308 and 310, respectively. It will be clear to one skilled in the art, after reading this specification, how to specify, make, and use coupler 106.

At operation 203, light signal 110 is received by sensor element 112, which distributes light signal 110 into reflected light signal 114 and transmitted light signal 116 based on acceleration of displacement sensor 100 along the x-direction.

FIGS. 4A and 4B depict a top view and cross-sectional view, respectively, of a schematic diagram of details of a sensor element in accordance with the illustrative embodiment of the present invention. Other sensor elements suitable for use in the present invention have been disclosed in other patent applications filed by the present inventor, including U.S. patent application Ser. Nos. 11/278,990, filed Apr. 7, 2006, and 11/421,593, filed Jun. 1, 2006, each of which is incorporated in its entirety by reference herein. Sensor element 112 comprises plate 402, mirror 404, tethers 406, substrate 414, and spacer 422.

Sensor element distributes light signal 110 into reflected light signal 114 and transmitted light signal 116 based on the instantaneous separation, L, between surfaces 416 and 418. The separation, L, is the cavity length of an optically resonant cavity collectively defined by surface 416 (of substrate 424) and surface 418 (of mirror 404). Mirror 404 is mechanically coupled with plate 402, which is physically adapted to move in response to an acceleration along the x-direction. As a result separation L is based on the acceleration along the x-direction. The ratio of optical energy in light signals 114 and 116, therefore, is based on the acceleration along the x-direction.

Plate 402 is a central region of layer 410, which is a layer of metal having a thickness of approximately 200 microns. Plate 402 comprises optional through-hole 412, which enables egress from the optically resonant cavity for transmitted beam 116.

Plate 402 is held in its quiescent position (i.e., its position in the absence of an acceleration along the x-direction) by tethers 406. The four tethers 406 collectively define a support system for plate 402. Each of tethers 406 acts as a resilient member (i.e., spring) that enables plate 402 to move in response to an environmental stimulus while also providing a restoring force to move plate 402 back to its quiescent position. Tethers 406 and plate 402 are formed by removing portions of layer 410 via chemical etching. Plate 402 and tethers 406 collectively define shaped, movable membrane 408. In some embodiments, plate 402, through-hole 412, and tethers 406 are formed out of layer 410 by a different suitable process, such as stamping, milling, photoetching, and the like. In some embodiments, membrane 408 is a continuous membrane and does not comprise a defined plate and/or tethers.

In some embodiments layer 410 is a layer of non-metallic material that is cast into its desired shape that includes plate 402. Materials suitable for use in layer 410 include, without limitation, metals, ceramics, polymers, glasses, composite alloys, metallic alloys, graphite, and semiconductors.

In some embodiments, plate 402 and tethers 406 are not formed out of a single layer. In some embodiments, plate 402 and tethers 406 are discrete elements that are mechanically coupled to enable motion of plate 402 relative to substrate 412. In some embodiments, plate 402 and tethers 406 form a non-membrane-like mass-spring system whose restoring force is dominated by one or more induced bending moments.

Mirror 404 is a layer of silicon dioxide having a thickness of approximately 1 millimeter. Surface 418 of mirror 404 comprises a mirror layer that is partially reflective for light signal 110. Mirror layers suitable for use with mirror 404 include metal layers, dielectric layers, two-dimensional photonic bandgap layers, and the like. In some embodiments, mirror 404 also comprises an anti-reflection layer disposed on the surface proximate to plate 402 to mitigate the effects of reflections at this surface.

Substrate 414 is a silicon dioxide layer having a thickness of approximately 2 millimeters. Surface 424 of substrate 414 comprises an anti-reflection coating that minimizes the reflectivity of surface 424 for light signal 110. In some embodiments of the present invention, substrate 414 is a material other than silicon. Suitable materials for substrate 414 include, without limitation, glass, III-V compound semiconductors, II-VI compound semiconductors, ceramics, and germanium. In some embodiments of the present invention, substrate 414 comprises an access hole and a suspended layer that comprises surface 416. It will also be clear to those skilled in the art, after reading this specification, how to make and use alternative embodiments of the present invention wherein substrate 414 has a thickness other than 2 millimeters and/or mirror 404 has a thickness other than 1 millimeter.

Surfaces 416 and 418 collectively define optically resonant cavity 420, which has a cavity length equal to their instantaneous separation, L. Optically resonant cavity 420 has an initial cavity length (i.e., the value of L when plate 402 is in its quiescent position) that is determined by the thickness of spacer 422. This initial cavity length determines the ratio of optical energy in light signals 114 and 116 in the absence of an acceleration.

Light signal 110 is incident on optically resonant cavity 420 at an angle of incidence, $\theta 2$, that is non-normal with respect to surfaces 416 and 418. In other words, the angle formed by the direction of propagation of light signal 110 and each of surfaces 416 and 418 is other than 90 degrees. It should be noted that in some embodiments, some deformation of one or both of surfaces 416 and 418 could occur in response to an acceleration (or other sensed environmental stimulus). Such deformation is neglected in the consideration of the magnitude of angle $\theta 2$.

Spacer 422 is a precision ceramic spacer that has a thickness of approximately 3 millimeters and a cavity for receiving mirror 404. In some embodiments of the present invention, spacer 422 comprises a material other than ceramic. Suitable materials for spacers 218 include, without limitation, metals, silicon, germanium, epoxies, solder, silicon dioxide, glass, alumina, III-V compound semiconductors, and II-VI compound semiconductors. Although the illustrative embodiment comprises a spacer that has a thickness of approximately 3 millimeters, it will be clear to those skilled in the art, after reading this specification, how to make and use alternative embodiments of the present invention that comprises one or more spacers that have a thickness of other than 3 millimeters.

In response to an acceleration of displacement sensor 100 along the x-direction, mirror 404 is displaced either toward or away from substrate 414. As a result, separation L changes, thereby changing the distribution of the optical energy of light signal 110 into light signals 114 and 116.

At operation 204, light signal 114 is reflected from sensor element 112 and is received by coupler 106. Coupler 106 directs light signal 114 toward photodetector 120 as light signal 118. In some embodiments, coupler 106 also focuses, at least partially, light signal 118.

At operation 205, light signal 116 exits sensor element 112 and propagates toward photodetector 122. In some embodiments, displacement sensor 100 comprises an optical lens that receives light signal 116 and directs it toward photodetector 122.

At operation 206, photodetector 120 generates electrical signal 124 based on the intensity of light signal 118, which is based on the intensity of light signal 114.

At operation 207, photodetector 122 generates electrical signal 126 based on the intensity of light signal 116.

At operation 208, processor 128 receives electrical signal 124 and 126 and generates electrical output signal 130 based on these received electrical signals.

Processor 128 is a general-purpose processor that is capable of reading data and instructions from a memory, of executing instructions, of writing data to a memory, of receiving data from detectors 120 and 122, and of generating electrical signal 130. Processor 128 receives electrical signals 124 and 126 and performs signal processing based on those signals. It will be clear to those skilled in the art, after reading this specification, how to make and use processor 128.

In some embodiments of the present invention, processor 128 comprises analog circuitry, such as a closed-loop feedback circuit, for reducing noise-derived contributions to electrical signal 130.

The present invention affords several advantages over the prior art. First, since coupler 106 directs light signal 110 toward sensor element such that the light is incident on the sensor element at a non-normal angle, little or no optical energy can be reflected back along the path of light signals 110 and 104 to source 102. In other words, the arrangement of source 102, coupler 106, and sensor element 112 suppresses back reflections to source 102.

Second, particular advantage is derived from the present invention in that misalignments in the optical system are substantially "self-corrected." The relative positions of lens 304, substrate 302, and lens 306 are fixed. In some embodiments, these elements are monolithically-integrated. As a result, an inadvertent misalignment of source 102 relative to lens 304, for example, would result in light signal 104 striking lens 306 at a slightly different spot than its designed point of incidence. If this point is further away from central optical axis 108 of lens 306, light signal 110 would be "bent" at a larger angle (i.e., θ1 would increase). If the light signal 104 hits lens 306 at a spot nearer central optical axis 108, θ1 would decrease. In the illustrative embodiment, for example, misalignment of up to ±20 microns can be tolerated at lens 304. The present invention, therefore, provides both back reflection suppression and improves alignment tolerance.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
    a source of optical energy having a first wavelength, wherein the source enables the propagation of the optical energy along a first direction;
    an optically resonant cavity comprising a first surface and a second surface that collectively define the optically resonant cavity, wherein the optically resonant cavity distributes received optical energy having the first wavelength into a first portion and a second portion, and wherein the ratio of the first portion and the second portion is based on an environmental stimulus; and
    a lens having a central optical axis;
    wherein the source, lens, and optically resonant cavity are arranged such that;
    (1) the lens receives the optical energy from the source, wherein the received optical energy is centered at a point that is displaced from the central optical axis;
    (2) the lens redirects the optical energy so that the optical energy propagates along a second direction toward the optically resonant cavity, wherein the first direction and the second direction are non-co-linear; and
    (3) the optically resonant cavity receives the optical energy that propagates along the second direction, wherein the second direction is non-orthogonal with the first surface.

2. The apparatus of claim 1 wherein the optically resonant cavity has a cavity length that is based on the environmental stimulus.

3. The apparatus of claim 1 further comprising a first photodetector for generating a first electrical signal based on the first portion, wherein the lens receives the first portion from the optically resonant cavity and directs the first portion toward the first photodetector.

4. The apparatus of claim 3 further comprising a second photodetector for generating a second electrical signal based on the second portion.

5. The apparatus of claim 1 wherein the first surface is movable, and wherein the first surface moves based on the environmental stimulus.

6. The apparatus of claim 5 further comprising a proof mass, wherein the first surface and the proof mass are mechanically coupled.

7. The apparatus of claim 5 wherein the first surface is mechanically coupled with a movable membrane.

8. The apparatus of claim 5 wherein the first surface is mechanically coupled with a plate that is held by at least one tether that is resilient.

9. An apparatus comprising:
    a first lens having a central optical axis, wherein the first lens receives a first light signal that propagates along a first direction, and wherein the first lens provides a second light signal that propagates along a second direction, and further wherein the first direction and the second direction collectively define an angle that has a magnitude that is between 0 degrees and 90 degrees;
    a first surface and a second surface that collectively define an optically resonant cavity for the second light signal, wherein the first surface is a movable surface, and wherein the first surface moves in response to an environmental stimulus, and wherein the first surface and the second direction are mutually non-orthogonal, and further wherein the optically resonant cavity receives the second light signal and provides a third light signal to the first lens; and a first photodetector, wherein the first photodetector receives the third light signal from the first lens and provides a first electrical signal based on the intensity of the third light signal.

10. The apparatus of claim 9 further comprising a second photodetector, wherein the optically resonant cavity provides a fourth light signal, and wherein the second photodetector receives the fourth light signal and provides a second electrical signal based on the intensity of the fourth light signal.

11. The apparatus of claim 9 wherein the first lens receives the third light signal such that the received third light signal is substantially concentric with the central optical axis.

12. The apparatus of claim 9 wherein the environmental stimulus is selected from the group consisting of sound, vibration, shock, pressure, and acceleration.

13. The apparatus of claim 9 further comprising a proof mass, wherein the proof mass and the first surface are mechanically coupled.

14. The apparatus of claim 9 further comprising a second lens, wherein the second lens receives an input light signal and provides the first light signal.

15. A method for sensing an environmental stimulus comprising:
providing a first light signal that propagates along a first direction;
redirecting the first light signal as a second light signal that propagates along a second direction, wherein the second direction and the first direction form an angle that is between 0 degrees and 90 degrees;
receiving the second light signal at an optically resonant cavity comprising a first surface and a second surface that collectively define the optically resonant cavity, wherein the optically resonant cavity distributes the second light signal into a third light signal and a fourth light signal, and wherein the ratio of the third light signal and fourth light signal is based on the environmental stimulus, and further wherein the second direction and at least one of the first surface and second surface forms are mutually non-orthogonal;
generating a first electrical signal based on the third light signal; and
generating a second electrical signal based on the fourth light signal.

16. The method of claim 15 further comprising computing a third electrical signal, wherein the third electrical signal is based on the first electrical signal and the second electrical signal.

17. The method of claim 15 wherein the first light signal is redirected as the second signal by receiving the first light signal at a lens having a central optical axis, wherein the received first light signal and the central optical axis are non-co-incident.

18. The method of claim 15 further comprising providing the optically resonant cavity, wherein the optically resonant cavity has a cavity length that is based on the environmental stimulus.

19. The method of claim 18 wherein the optically resonant cavity is provided such that the first surface is movable, and further wherein the first surface moves in response to the environmental stimulus.

20. The method of claim 18 wherein the optically resonant cavity is provided such that the first surface is a surface of a mirror that is at least partially reflective for the second light signal, and further wherein the first surface and a movable membrane are mechanically coupled.

21. The method of claim 18 wherein the optically resonant cavity is provided such that the first surface is a surface of a mirror that is at least partially reflective for the second light signal, and wherein the first surface and a movable plate are mechanically coupled, and further wherein the movable plate is held by at least one tether that is resilient.

* * * * *